Figure 1:
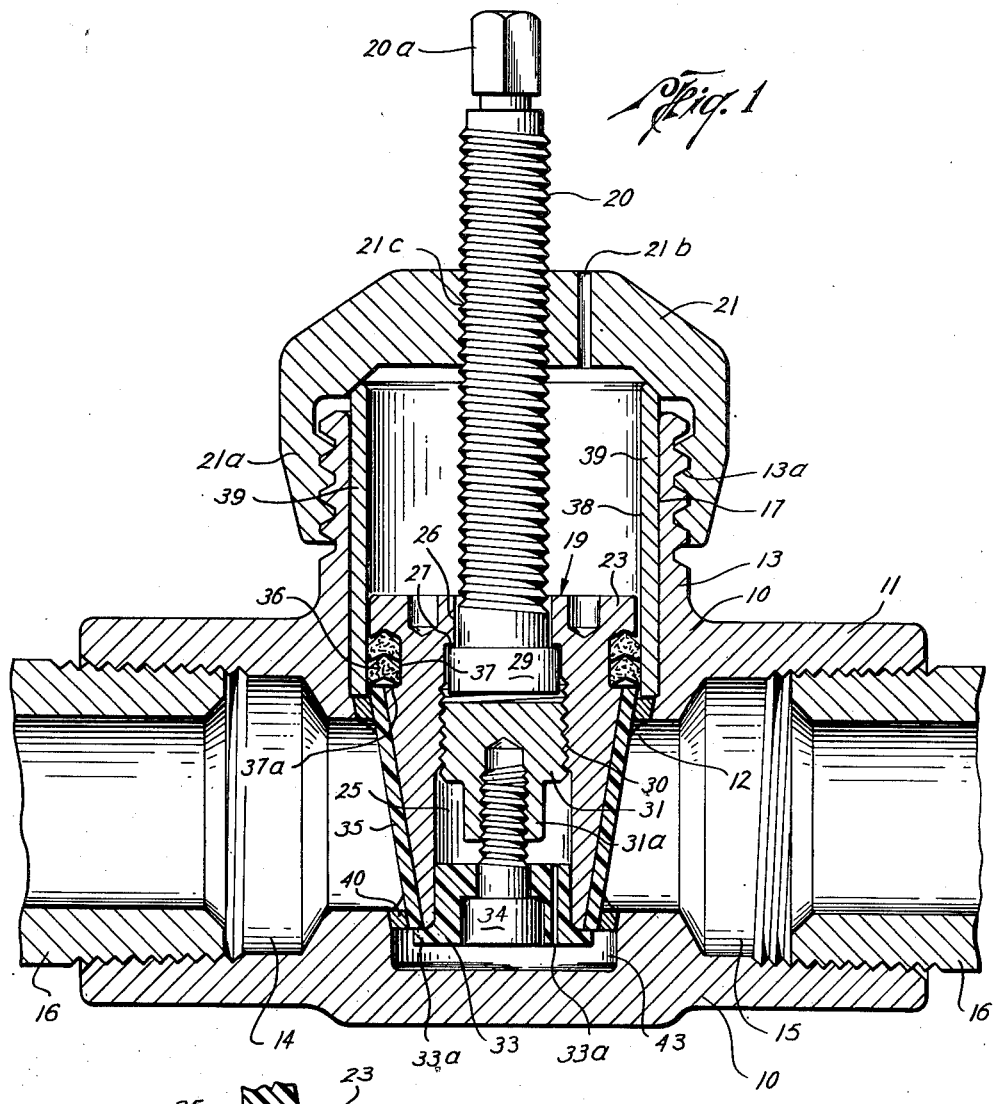

June 25, 1957 R. OTTER 2,797,062
VALVES
Filed May 26, 1952 3 Sheets-Sheet 1

Roy Otter
INVENTOR.

BY J. Vincent Martin
Jos. E. Edwards
& B. R. Travel
ATTORNEYS

June 25, 1957 R. OTTER 2,797,062
VALVES
Filed May 26, 1952 3 Sheets-Sheet 2

Roy Otter
INVENTOR.

ATTORNEYS

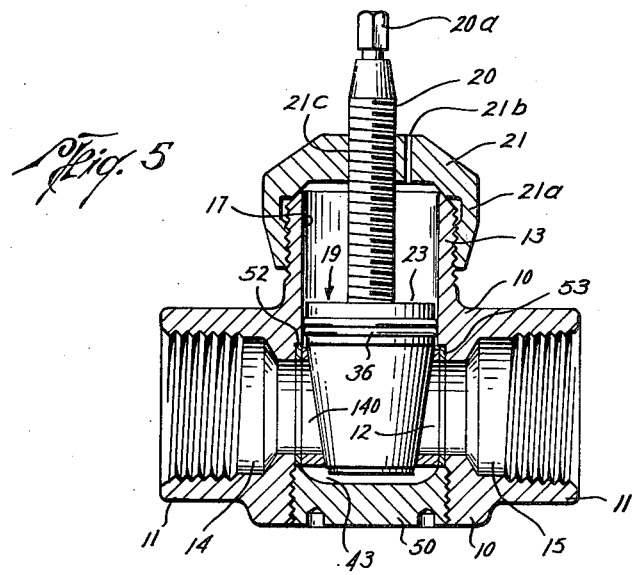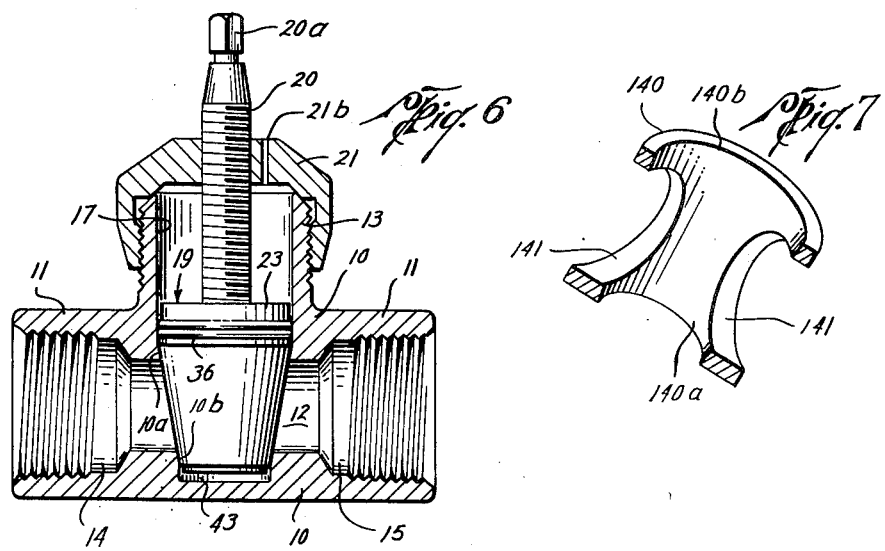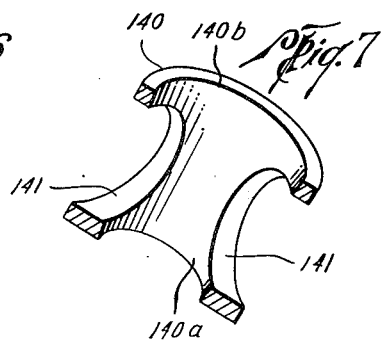

United States Patent Office 2,797,062
Patented June 25, 1957

2,797,062
VALVES

Roy Otter, Houston, Tex., assignor to Oil Center Tool Company, Houston, Tex., a corporation of Texas Application May 26, 1952, Serial No. 289,949

1 Claim. (Cl. 251—168)

This invention relates to new and useful improvements in valves, and particularly to a plug valve.

In valves which are used for opening and closing pipe lines carrying fluids under high pressure, such as drilling mud used in the drilling of oil wells and the like, it becomes extremely important for the valve to have a pressure seal at the valve seat when the valve is closed, such pressure seating of the valve being accomplished with a minimum of effort by the operator. It is also particularly desirable to have a valve construction in which a seal is maintained in the housing above the valve seat to prevent the fluid under high pressure from passing out of the valve when the valve is in the open position. It is also desirable to have a mud valve in which the internal expandable parts may be replaced without removing the valve housing or body from the pipe line, such removal being easily effected simply by removing the valve bonnet or a threaded cap. In order to increase the wear life of a valve when using a resilient seat, it is particularly desirable to provide for relative movement of the plug valve sleeve with respect to the fixed valve seat to thereby change the point of contact of the valve seat at various times of engagement with the valve seat so that the wear on the sleeve is distributed substantially over the entire contact surfaces of the valve seat and the valve sleeve on the plug.

It is therefore an object of this invention to provide a mud valve having a deformable elastic member on the valve plug whereby the deformable member enables a working pressure seal to be obtained in the closed position of the valve with only a slight manual effort being necessary to accomplish such seal.

Another important object of this invention is to provide a plug valve wherein the plug has a seal at its upper portion to sealingly engage with the cavity above the flow line of the valve housing, whereby a seal is maintained by the plug even in the open position to prevent the escape of the high pressure fluid or mud passing through the flow portion of the valve body.

Another object of this invention is to provide a plug valve wherein the plug is of conical construction and has thereon a resilient sleeve for engagement with a conical valve seat, the valve plug being mounted for relative rotative movement with respect to a stem to permit the plug to shift circumferentially about the stem to enable the wear on the resilient sleeve to be evently distributed during the life thereof.

Another object of this invention is to provide a plug valve having a conical plug with a deformable sleeve thereon, such sleeve being normally mounted in fixed relationship to the plug but being slidable therewith upon the sleeve engaging the valve seat so that a wedging action of the plug on the resilient sleeve is obtained to move the sleeve into lateral distortion for obtaining a working pressure seal.

The construction designed to carry out the invention will be hereinafter described together with other features thereof.

Figure 2:
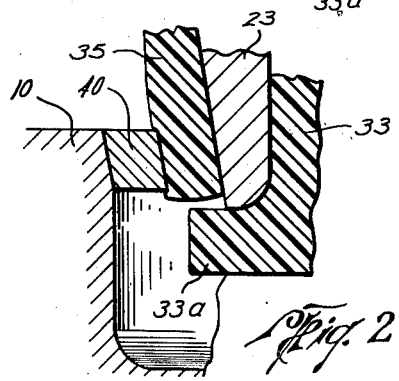
Figure 3:
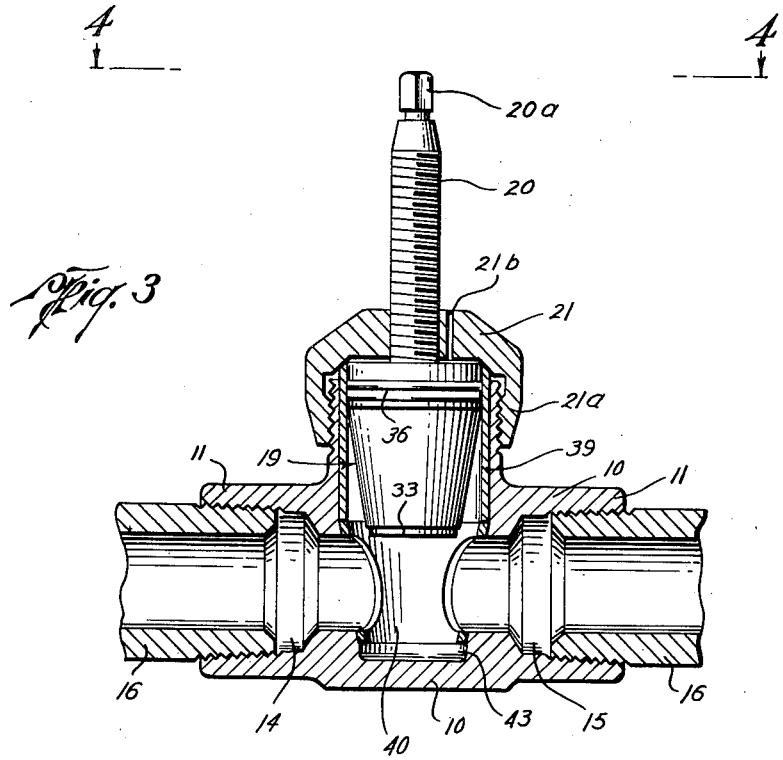
Figure 4:
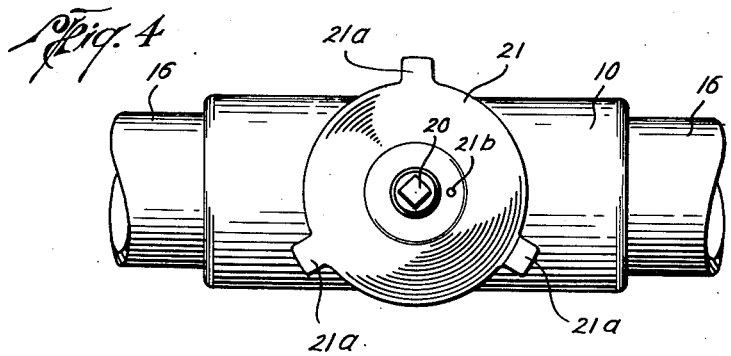

The invention will be more readily understood from a reading of the following specification and by reference to the accompanying drawings forming a part thereof, wherein an example of the invention is shown, and wherein:

Figure 1 is a sectional view of the valve of this invention, illustrated in one of its forms, wherein a conical shell is used as the valve seat, Figure 2 is a sectional view of a portion of the valve illustrated in Figure 1, and particularly illustrating the relative sliding movement of the plug wtih respect to the resilient sleeve whereby the high pressure seal is obtained with the valve seat, Figure 3 is a view partly in section and partly in elevation, illustrating the valve shown in Figure 1 in its open position, Figure 4 is an elevational view taken on line 4—4 of Figure 3, Figure 5 is a sectional view, partly in elevation, illustrating another modification of the valve of this invention, shown in its closed position, Figure 6 is a sectional view, partly in section, illustrating still another modification of the valve of this invention, shown in its closed position, and Figure 7 is an isometric view of the valve seat used in the modification shown in Figure 5.

In the drawings, the numeral 10 designates a valve housing or body which has diametrically opposite lateral extensions 11 projecting therefrom and preferably made integral therewith. The interior of the housing forms a valve chamber 12 and extending upwardly from said chamber is a collar 13 which is also preferably made integral with the housing. The lateral extensions 11 have their bores 14 and 15 internally threaded to receive the sections 16 of pipe which form a part of a pipe line or conductor such as used to conduct the flow of mud in the drilling of oil wells and the like. The valve chamber 12 which is formed by the interior of the valve housing is disposed between the bores 14 and 15 of the extensions and its upper end communicates with the bore 17 of the upwardly extending collar. A valve member generally designated by the numeral 19 is longitudinally movable in the valve chamber 12 and within the collar 13 and has the lower end of a valve stem 20 connected thereto; the valve stem has external threads which engage an axial threaded opening provided in a bonnet or cap 21 which is on the upstanding collar 13. The bonnet or cap is preferably secured to the collar by coarse threads 13a which form a quick coupling arrangement. When the valve member is in an inward or seated position within the valve chamber (Fig. 1) flow through the conductor or pipe 16 is shut off but obviously when the valve member is raised or moved outwardly into the collar 13, as shown in Figure 3, fluid may flow past the unseated valve through said pipe 16. Movement of the valve member is of course controlled by rotation of the operating stem 20.

Referring now to Figure 1, it can be seen therein that the valve plug member 19 includes a plug 23 having an opening 25 centrally disposed therethrough. This opening 25 is of substantially uniform diameter throughout its length except at its upper end which is reduced at 26 to form an internal shoulder 27. The lower end of the valve stem 20 is formed with an enlarged head 29 which is positioned within the opening 25 of the plug 23 and contacts the shoulder 27 when the stem 20 is moved upwardly to open the valve.

Within the opening 25 below the shoulder 27 there is positioned threads 30 which receive a threaded insert 31. This threaded insert 31 serves as an abutment means for the enlarged head 29 when the stem 20 is moved downwardly after the plug 23 has reached an initial seating position, as will be explained more in detail hereinafter. The insert 31 additionally serves to hold the retainer 33 at the lower end of the plug 23. This retainer 33 is of resilient material such as rubber, natural or synthetic, or of any equivalent resilient material such as the synthetic resins. The retainer 33 is held in the position shown in Figure 1 relative to the plug 23 by a bolt 34 threadedly engaged with the lower end 31a of the insert 31. The retainer 33 preferably has an opening 33a therethrough to serve as an equalizing port to prevent an undue strain being placed upon the retainer 33 due to the fluid pressure.

As can be seen in Figure 1, the plug 23 is of conical shape and has mounted therearound a conical sleeve 35 of a resilient material. This resilient material forming the conical sleeve 35 may be rubber, synthetic or natural, or any equivalent synthetic resin. The resilient conical sleeve 35 is normally retained between the flanges 33a of the retainer 33 and the packing means 36 mounted on the plug 23, except when the plug valve member 19 is in the fully seated position as will be explained more in detail hereinafter. The packing means 36 is preferably a chevron type of packing which fits into an annular recess or groove 37 in the plug 23. As can be seen in Figure 1, the packing 36 exteinds beyond the bottom edge 37a of the recess 37, whereby the packing 36 rests not only in the recess 37 but also is upon and contacts with the sleeve 35. The outer peripheral surfaces of the packing 36 are adapted to maintain sealing engagement with the bore 38 of a cylindrical bushing 39 which is disposed within the bore 17 of the collar 13. It is noted that the bushing could be omitted as shown in Figures 5 and 6, in which event the packing will engage the bore 17 of the collar.

In the modification shown in Figure 1, a removable valve seat 40 has been provided. This valve seat 40 is of conical shape and has openings 41 at each side thereof to coincide with the bores 14 and 15 of the extensions 11. The valve seat 40 is retained against inward movement by reason that its wedging action with the valve body 10 which is tapered to conform with the outer surface of the conical valve seat 40, and the seat 40 is also restricted against outward movement by the cylindrical bushing 39 which is held between the bonnet 21 and the upper end of the valve seat 40.

The bonnet or cap 21 which is attached to the collar 13 may have depending fingers 21a such as shown in Figure 4 which have their inner surfaces threaded to engage the threads 13a or the entire lower portion of said bonnet may be annular and internally threaded to connect with said threads 13a. The bonnet 21 has an opening 21b therein which serves as an equalizer port when the valve plug member 19 moves longitudinally upwardly and downwardly in the valve chamber 12. The valve operating stem 20 which is threaded through the threads 21c of the bonnet 21 has a flat sided head 20a which is adapted to be handled either by a wrench or a handle mounted thereon.

In the operation of the valve shown particularly in Figures 1–4, the valve is moved to the open position shown in Figure 3 by simple rotation of the valve stem 20, as is well known. In moving the valve member 19 to open same, the packing means 36 maintains a constant seal between the portions of the valve chamber 12 thereabove and therebelow so that fluid passing through the open valve will not escape through the bonnet 21. When the valve plug 23 is being moved outwardly the enlarged head 29 on the stem 20 engages wtih the shoulder 27 so that outward movement is imparted thereby to the plug 23. Since the retainer 33 is fixed in relationship to the plug 23, it in turn serves to retain the sleeve 35 fixed relative to the plug 23 in its outward movement.

When it is designed to close the valve, the stem 20 is rotated for movement inwardly and the enlarged head 29 abuts against the top of the insert 31 to force the plug 23 inwardly. In this inward movement the sleeve 35 is restrained against the outward movement by reason of its abutment with the packing means 36 which is retained in the groove 37 of the plug 23. When the valve member 19 reaches its initial closed position, the plug 23, sleeve 35, and the other parts thereof are in the relative position shown in Figure 1. At this point the sleeve 35 has engaged the valve seat 40 and is held against further inward movement by reason of such frictional engagement and wedging action. However, the plug 23 can continue to move inwardly since the sleeve 35 is slidable on the plug 23, and such continued inward movement of the plug 23 causes distortion of the sleeve 35 in the lateral direction due to the tapered or conical surface of the plug 23 which is in engagement with the inner conical surface of the sleeve 35. Thus, as seen particularly in Figure 2, the plug 23, upon continued inward movement, slides on the sleeve 35 which is retained against further inward movement by the valve seat 40, and such movement causes a lateral distortion and sealing of the sleeve 35 at the points of its engagement with the valve seat 40. This tight sealing engagement of the sleeve 35 with the valve seat 40 is possible with only a slight amount of force being applied to the valve stem 20 and a seal is provided which will withstand extremely high fluid pressures. It will be observed that in the lower portion of the valve body 10, there is the recess 43 into which the retainer 33 moves during the sealing engagement of the sleeve 35 with the valve seat 40 when the plug 23 is moving to the finally sealed or closed position. It should also be pointed out that the sleeve 35 cannot be wedged outwardly when the plug 23 is urged inwardly even after the initial seating because of the packing means 36 which extends over the upper ends of the sleeve 35 and into the grooves 37 of the plug 23.

The packing means 36 thus provides a resilient means to prevent the outward displacement of the sleeve 35 during the lateral distortion thereof in the obtaining of the finally closed position of the valve.

When it is desired to open the valve from its finally closed sealed position, the stem 20 is rotated into abutment with the shoulders 27 to move the plug 23 outwardly. When the retainer 33 contacts the lower edge of the sleeve 35 the sleeve 35 must then move outwardly with the plug 23 to open the valve.

In the modification shown in Figures 1–4, the expandable parts, such as the valve member 19 and the valve seat 40 and the bushing 39, are removable without removing the body 10 from the connected pipes 16 by simply removing the bonnet 21 and sliding the valve member 19 out of the body 10 entirely. Then the bushing 39 can be removed and thereafter the valve seat 40 can be removed. It will be thus seen that the removal of the expendable parts of the valve is easily effected without the removal of the valve body or housing from the connected pipe lines.

In the modification shown in Figures 5 and 7, the essential parts of the valve of this invention are substantially the same. However, a different construction is utilized in the valve seat, as can best be seen by viewing the valve seat 140 shown in Figure 7. This valve seat 140 has a cylindrical outer surface 140a and a conical inner surface 140b, with openings 141 therein extending from the outer cylindrical surface 140a to the inner conical or tapered surfaces 140b. With the valve seat 140 as shown in Fig. 7, the valve seat may be inserted from below the valve chamber 12 by providing a removable threaded disk 50 which seats in the lower part of the housing 10. The disk 50 is removed and the valve seat 140 is inserted into the opening of the valve chamber 12 and is caused to abut against a shoulder 52 on the inside of the valve chamber 12 to prevent movement of the valve seat 140 therebeyond after it is in position with the openings 141 aligned with the passages 14 and 15. The disk 50, of course, when in position as shown in Figure 5, retains the valve seat 140 thereagainst so that the valve seat 140 is held in fixed position during the operation of the valve. In some cases it may be desirable to provide additional sealing rings in this construction, such as shown at 52 and 53, on either side of the valve seat 140. These seal rings 52 and 53 are preferably made of a resilient material, such as rubber or synthetic resins. It will be noted that the bushing 39 as shown in Figure 1 may be eliminated in the valve of Figure 5 if desired. Except for the assembly and is assembly of the valve shown in the modification of Figures 5 and 7, this valve operates in the identical manner with that shown in Figures 1–4.

In Figure 6 is shown another modification of the valve of this invention wherein the housing 10 has tapered portions 10a, and 10b, which serve as the valve seat. Thus, in this form there is no removable valve seat as illustrated in the other figures. Also, the bushing 39 as used in Figure 1 may be eliminated in this form. Except for these these differences, the valve illustrated in Figure 6 is substantially identical and operates in substantially the same manner as that shown in Figure 1 having all of the advantages thereof.

From the foregoing it is believed evident that a plug valve of a conical construction has been devised wherein as high pressure seal is obtainable with a minimum of effort by providing a lateral distortion of a sleeve with the valve seat.

The foregoing disclosure and description of the invention is illustrative and explanatory thereof, and various changes in the size, shape and materials, as well as in the details of the illustrated construction may be made, within the scope of the appended claim, without departing from the spirit of the invention.

What is claimed is:

A plug valve including, a valve body having a valve chamber therein and having inlet and outlet passages extending therefrom, valve seats within the chamber adjacent the inlet and outlet passages, a valve element movable within the chamber with respect to the valve seats for controlling flow through the passage, said valve element comprising a generally conical plug, a generally conical sleeve surrounding the plug, means secured to the plug and engaging the smaller end of the sleeve for retaining the sleeve against displacement from the plug, and a resilient annular element mounted on the plug and engaging the opposite end of the sleeve to prevent displacement of the sleeve from the plug, said last named resilient element permitting limited sliding movement of the sleeve relative to the plug whereby after the sleeve is engaged with the valve seats the conical surface of said plug may coact with the bore of the sleeve to urge said sleeve into tighter sealing engagement with said seats.

References Cited in the file of this patent

UNITED STATES PATENTS

| 468,029 | McKim | Feb. 2, 1892 |
| 1,237,719 | Spencer | Aug. 21, 1917 |
| 2,204,452 | Seppelfricke | June 11, 1940 |
| 2,285,393 | Cline | June 9, 1942 |
| 2,359,741 | Venton | Oct. 10, 1944 |
| 2,633,326 | Givens | Mar. 31, 1953 |

FOREIGN PATENTS

| 3,200 | Great Britain | of 1887 |
| 7,517 | Great Britain | of 1891 |